(12) United States Patent
Petty et al.

(10) Patent No.: US 6,337,858 B1
(45) Date of Patent: Jan. 8, 2002

(54) METHOD AND APPARATUS FOR ORIGINATING VOICE CALLS FROM A DATA NETWORK

(75) Inventors: Douglas Petty; Michael William Petras, both of Nepean; Raul San Martin, Ottawa; Alan Stuart Frank, Nepean; Vivek Kapil, Ottawa; Dhansukh Mistry, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/948,975

(22) Filed: Oct. 10, 1997

(51) Int. Cl.[7] .............................................. H04L 12/56
(52) U.S. Cl. ...................................... 370/356; 370/410
(58) Field of Search ................................ 370/352, 353, 370/354, 355, 356, 400, 401, 466, 402, 403, 404, 405, 410; 379/201, 209, 211, 212, 214, 215, 88.17, 93.01, 93.09; 709/704, 206, 227, 249

(56) References Cited

U.S. PATENT DOCUMENTS

| | | | |
|---|---|---|---|
| 4,191,860 A | | 3/1980 | Weber ....................... 179/18 B |
| 5,602,846 A | * | 2/1997 | Holmquist et al. .......... 370/384 |
| 5,675,507 A | * | 10/1997 | Bobo, II ....................... 709/206 |
| 5,742,596 A | * | 4/1998 | Baratz et al. ................ 370/356 |
| 5,781,614 A | * | 7/1998 | Brunson .................... 379/88.14 |
| 5,805,587 A | * | 9/1998 | Norris et al. ................ 370/352 |
| 5,862,203 A | * | 1/1999 | Wulkan et al. .............. 379/114 |
| 5,870,549 A | * | 2/1999 | Bobo, II ....................... 709/206 |
| 5,884,032 A | * | 3/1999 | Bateman et al. ............. 709/204 |
| 5,970,126 A | * | 10/1999 | Bowater et al. ............. 379/114 |
| 5,974,043 A | * | 10/1999 | Solomon ...................... 370/352 |
| 5,991,291 A | * | 11/1999 | Asai et al. ................... 370/352 |
| 6,069,890 A | * | 5/2000 | White et al. ................. 370/352 |

FOREIGN PATENT DOCUMENTS

| | | | |
|---|---|---|---|
| FR | 2677517 A1 | 10/1991 | .......... H04M/11/00 |
| WO | 97/14238 | * 4/1997 | .......... H04L/12/46 |
| WO | 97/19548 | * 5/1997 | .......... H04M/15/00 |

OTHER PUBLICATIONS

"Internet Call Center", Lucent Technologies web page, 1996.
"Internet Call Center", Lucent Technologies, 1996.
News Release "Lucent Technologies debuts WebCall in Japan", Lucent Technologies, May 8, 1997.
News Release "Lucent Technologies brings award–winning advanced call center capabilities to small businesses", Lucent Technologies, Jun. 10, 1997.
"Lucent Technologies ' Internet Telephony Server", Lucent Technologies, 1997.

\* cited by examiner

Primary Examiner—Kwang B. Yao
(74) Attorney, Agent, or Firm—Max R. Wood; Swabey Ogilvy Renault (57) ABSTRACT

A method and apparatus for providing voice communications between two parties using computer controlled telephony hardware which is separate from the PSTN is described. The voice communications may be voice over Internet or PSTN voice connections, or any combination of the two. The apparatus includes a WEB server, a computer telephony server, a Voice over IP gateway and an operations, administration and maintenance server. The apparatus is suitably installed and operated by a service provider such as an Internet Service Provider. The advantage is unexcelled control over call setup, transfer and conference functions. A further advantage is the rapid, unfettered development of new services without compatibility issues with the PSTN.

30 Claims, 10 Drawing Sheets

METHOD AND APPARATUS FOR ORIGINATING VOICE CALLS FROM A DATA NETWORK

FIELD OF THE INVENTION

This invention relates to voice communications and, in particular, to providing voice communications between two parties using computer controlled telephony hardware which is outside the Public Switched Telephone Network.

BACKGROUND OF THE INVENTION

The importance of effective communication tools for use by business in advertising, product support, promotion and sales has long been recognized. Much inventive ingenuity has been invested in the development of tools for facilitating and improving business communications. A prime example is modern toll free calling services, commonly referred to as 800 calling services, which were enabled by an invention described in U.S. Pat. No. 4,191,860 to Weber. 800 calling services have since been vastly improved and made increasingly available as a business tool. In particular, sophisticated call centers have been developed to permit persons generally described as agents to field calls from the public for the purposes of disseminating information, supporting products and selling products.

In recent years, the Internet has also become an important and increasingly accepted tool for disseminating business information and promoting products as well as providing support to business customers. Use of the Internet and, in particular, the Worldwide Web has become pervasive in the industrialized world. Consequently, the importance of the Worldwide Web as a business communications tool has been recognized. While its importance is recognized, the electronic information provided by many companies on the Worldwide Web is static and designed to appeal to the widest audience. It is therefore neither adequate nor designed to respond to the specific needs of individuals. In order to obtain the breadth of information most individuals require, it is generally necessary to call the business and verbally request specific information. This process is inefficient because the caller must explain to the business contact what information was viewed, as well as what further particulars are required. This inefficiency has been recognized as a drawback for some time. Consequently, facilities have been developed to permit individuals browsing the Worldwide Web to place voice calls from Web pages. Such facilities are commonly called "voice buttons". One such facility is described, for example, in applicant's co-pending U.S. patent application Ser. No. 08/652,659 filed on May 28, 1996 and entitled METHODS AND APPARATUS FOR ORIGINATING VOICE CALLS. That application describes methods and apparatus for originating voice calls between voice terminals using a data terminal and a data service node without requiring interaction with human attendants or interactive voice response systems to complete the call. In accordance with the method, an apparatus connected with a data network is used to send commands to a PSTN switching node to initiate a call between the voice terminals to permit the person browsing the Web to readily communicate with the business which owns the Web page, assuming that the user has a voice terminal available for accepting the call.

Other apparatus have also been developed, for example, Lucent Technologies® have developed methods and apparatus for integrating Worldwide Web pages and 800 call centers to permit browsers of a Worldwide Web page to launch a Voice over IP or a voice terminal connection to an 800 call center while providing an agent at the call center receiving the call with a data terminal screen "pop" of the same page the browser is observing. The agent is therefore visually attuned to the browser's position and enabled to quickly and efficiently answer questions or close transactions.

While such facilities greatly enhance a business' ability to respond to public need, they do not provide a viable solution for all businesses or provide a full range of potential services that can be developed through the inventive use of computer telephony integration. It is widely recognized that in the information age, small business is the driving force of the economy. While telecommunications service providers have recognized the need of small business to have access to such communications services as 800 call service and have lowered entry barriers to such services, 800 service is not necessarily well adapted to meet the needs of small business. This is particularly true where a small business derives most or all of its clientele from a local area. In that case, 800 service is of substantially no value. Even if a small business' clientele extends well beyond a local calling area, because of the inherent limitations in current 800 service offerings, many small businesses find it uneconomical or impractical to subscribe to an 800 service for a variety of reasons, including the general inflexibility of 800 call terminations which substantially require at least one full time person dedicated to servicing 800 inquiries.

Consequently, there is a recognized need for a more flexible yet cost effective method of providing voice services to medium and small sized businesses and, in particular, to providing voice services to medium and small sized businesses having a presence on the Worldwide Web.

SUMMARY OF THE INVENTION

It is an object of the invention to provide a method and apparatus to permit voice communications, between a consumer browsing the Internet and a business having an interactive information page on the Internet, independent of whether the user is within a toll free calling area of the business.

It is a further object to the invention to provide an apparatus and method to permit voice communications between the consumer and the business which is particularly adapted to serve small and medium sized businesses.

It is yet a further object to the invention to provide a method and apparatus for voice communications between the consumer and the business which employs a rule base to adapt the service to the resources of the business in order to permit maximum flexibility and ensure optimum service.

It is a further object to the invention to provide an apparatus and method adapted to offer call center functionality without call center infrastructure.

It is yet another object of the invention to provide an apparatus and method adapted to permit the rapid development of new call handling features for business subscribers having a presence on the Internet.

These and other objects are realized in a method of providing voice communications between two parties using computer controlled telephony hardware which is separate from the Public Switched Telephone Network (PSTN), at least one of the parties having access to a data network, comprising:

originating a first voice connection from the computer controlled telephony hardware in response to a call request received from the data network;

originating a second voice connection from the computer controlled telephony hardware in response to the call request received from the data network; and bridging together the first and second voice connections at the computer controlled telephony hardware to permit voice communications between the two parties.

In accordance with a further aspect of the invention there is provided a method of providing voice communication between a service subscriber and a user of a data network accessing an interactive information page available on the network using a data terminal, the information page including a voice communication request button relating to the service subscriber, comprising the steps of:

a) accepting a voice communication request from the user;

b) analyzing the voice communication request or a preference file stored on the user's data terminal to determine a voice connection medium preferred by the user;

c) consulting a rule base using a code that identifies the subscriber to locate at least one rule which determines how a voice connection is to be established with the subscriber;

d) operating computer telephony hardware to place a first call to the user by the preferred voice connection medium;

e) operating the computer telephony hardware to place a second call to the subscriber in accordance with the at least one rule located in the rule base;

f) operating the computer telephony hardware to bridge the first and second calls;

g) monitoring the data network for an indication that a modification of a configuration of the voice communication is desired by either the user or the subscriber and changing the configuration of the voice communication if an indication for change is received; and h) monitoring the first and second calls and disconnecting the other of the first and second calls when either of the first or second calls is disconnected.

In yet a further aspect to the invention, there is provided a system for providing voice communication between a service subscriber and a user of a data network accessing an interactive information page available on the network using a data terminal, comprising in combination:

at least one computing machine programmed with the functionality of:

a) a voice button server for accepting voice communication requests either directly or indirectly from a user accessing an interactive information page on a data network;

b) an operations, management and maintenance server to permit the establishment and maintenance of rule bases and related controls; and c) a computer telephony server for controlling computer telephony hardware;

a voice over data network gateway for converting voice data packets to voice telephony format; and computer telephony hardware which may be controlled by the computer telephony server to initiate voice connections on a switched telephone network or a voice gateway to a data network, to bridge calls and to respond to a set of predefined voice connection control commands which may originate from either the service subscriber or the user.

The invention therefore provides a method and apparatus for permitting a user browsing a data network such as the Worldwide Web (WWW) or the Internet to establish voice communications with a service subscriber associated with an interactive information page of the data network. The interactive information page includes a "voice button" which may be activated by the user to initiate voice communications to obtain more detailed information about the items being advertised. The user may select a preferred medium for the voice communication. If the user connects to the data network with his phone line, the user is likely to prefer a "Voice over IP" connection with the service subscriber. If the user has a data line as well as a phone line, the user will likely prefer a voice terminal connection over the phone line due to the superior sound quality. When a first time user activates the voice button, a data message is sent directly or indirectly from the user's terminal to a voice button server which determines from the message the identity of the service subscriber and the user's preferred voice connection medium. For repeat users, the preferred call medium may be looked up using a preference file stored on the user's data terminal. Such preference files are commonly called "cookies". The voice button server also examines a rule base to determine how the service provider wishes his leg of the call to be established. All call initiation and bridging is effected from computer telephony hardware comprising a switch fabric and a switch controller which permits ultimate flexibility with respect to the establishment, bridging, transfer and other call operations. The computer telephony hardware is the originating point for each leg of a voice connection. When a user requests voice communications, at least two calls are placed. A first call over the preferred medium (phone or Voice over IP) to the user and a second call to an agent for the service subscriber. Once both calls are established they are bridged by the computer telephony hardware to provide the voice communication Independent control of each leg of the call provides flexibility unrealized in prior art systems designed to enable voice communications between a browser of a data network and a service subscriber having a Web site on the data network. In addition, since only standard Public Switched Telephone Network (PSTN) functionality or standard Voice over IP functionality is used in call completion, no knowledge, control or adaptation of those protocols or procedures is required to construct, install or operate the system in accordance with the invention. Furthermore, there are no compatibility issues with the PSTN respecting deployment of the method or apparatus in accordance with the invention.

The method and apparatus in accordance with the invention are particularly adapted to provide efficient and flexible service from small to mid-sized businesses and to provide call center functionality without call center infrastructure. A rule base is used to permit the service to be configured to the specific needs of each service subscriber. Flexible features such as "simultaneous notification groups" (SNGs), "agent locator" and "automated page return" are just three examples of the flexibility enabled. In SNGs, two or more calls are launched simultaneously to different telephone numbers or IP addresses and the call which is answered first is bridged to the user requesting voice communications. With "agent locator", a plurality of calls may be launched simultaneously to different numbers or IP addresses for the same individual or different locations where the individual may be expected to be at any given time. A call is selected when an answering party enters a code identifying that party to be the agent sought. With "automated page return" a subscriber is paged using an identification number for a call being held. When the paged subscriber calls in and enters the identification number he is automatically bridged to the held calling party.

The apparatus in accordance with the invention preferably includes a voice button server, a voice over IP gateway, an operations, administration and maintenance server, and a computer telephony server which operates computer telephony hardware. Each server may be a separately programmed computing machine or the functionality of several servers may be configured in a single machine. The apparatus in accordance with the invention is particularly adapted for use by Internet Service Providers (ISPs) to permit the ISPs to offer their business subscribers a flexible service for business advertising, promotion, support and sales. The rule base permits each business to adapt the service to its own needs. It also permits the business to control call permissions and determine call completion patterns.

BRIEF DESCRIPTION OF THE DRAWINGS

The invention will now be further explained by way of example only and with reference to the following drawings, wherein.

DETAILED DESCRIPTION OF THE PREFERRED EMBODIMENTS

The invention relates to novel methods and apparatus for providing a service to subscribers with a presence on the Worldwide Web or the Internet. The service provides the tools to permit a user browsing the Worldwide Web to initiate voice communications with a subscriber by clicking on a voice button which appears on a page being viewed. Voice communication control is handled using computer telephony integration (CTI) hardware enabled to launch calls over the Internet, using a Voice over IP (VoIP) gateway or to initiate a Plain Old Telephone Service (POTS) call through the PSTN using dialed (DMTF) or packet (PRI) trunk technology well known in the art. For each voice communication session, at least two calls are made, a first call back from the service provider to the user browsing the WWW and a second forward from the service provider to a service subscriber designated in a rule base to receive the call. The two calls are then bridged within the CTI hardware. This arrangement is advantageous because it eliminates compatibility issues with PSTN switching equipment, enables rapid service development, and permits unequalled flexibility in call setup and redirection, which enables call control to be exercised by either the user or the service subscriber's agent.

Figure 1:
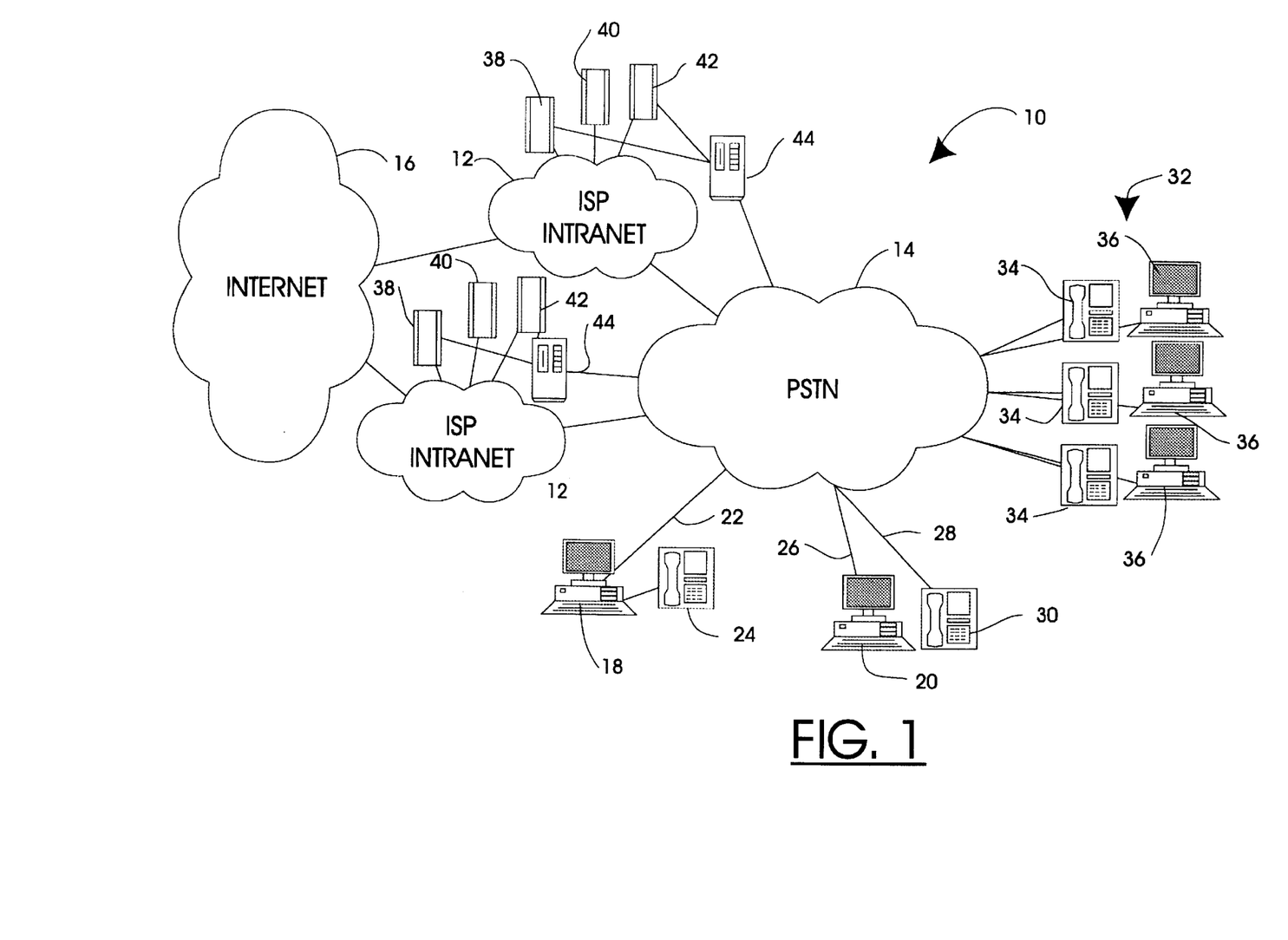
FIG. 1 is a schematic diagram of an overview of a communications network configured with apparatus in accordance with the invention.

FIG. 1 shows a schematic diagram of a communications network, generally indicated by the reference 10 equipped with apparatus in accordance with the invention. The apparatus in accordance with the invention is principally designed for use by a service provider such as an Internet Service Provider (ISP) 12. Each ISP 12 has an intranet that is connected to the Public Switched Telephone Network (PSTN) 14 in a manner well known in the art. Each ISP 12 intranet is also connected to the Internet 16 in a manner well known in the art. Internet users such as clients 18 and 20 typically access their ISPs using dial-up connections through the PSTN 14. Alternatively, clients 18, 20 may connect to their ISPs using cable modems (not illustrated) or the like. In some installations a user may have only one dial-up connection. For example, client 18 has a single dial-up connection 22 which serves the dual function of data transfer for Internet sessions and voice transfer for telephone conversations. Using telephone 24 client 20, on the other hand, has a dataline 26 for accessing the Internet and a telephone line 28 for voice communications using telephone 30.

A service subscriber generally indicated by reference 32 contracts an ISP 12 to maintain one or more pages on a Worldwide Web server which may be accessed on the WWW by clients 18, 20. The service subscriber 32 is typically a business having one or more business phones 34 and one or more computer workstations 36 connected directly or indirectly to the PSTN. The service subscriber 32 may have an Intranet (not illustrated). In addition, the telephones 34 and accompanying workstations 36 may be grouped in a single location or dispersed in different premises, different cities or even different countries. Using the apparatus and methods in accordance with the invention, there is no requirement to co-locate equipment or personnel as will be explained below in some detail.

The apparatus in accordance with the invention is typically owned and operated by the ISP 12 although it may also be owned and operated by any other institution including a business having adequate demand for the service it provides. The apparatus in accordance with the invention includes at least a web server 38, a computer telephony server (CTI Server) 40, a VoIP gateway 42 and CTI hardware 44. CTI hardware is well known in the art and available from, for example, Dialogic Corporation of Parsippony, N.J., U.S.A. Alternatively, the CTI hardware 44 may be incorporated in the CTI server 40 also in a manner well known in the art.

Figure 2:
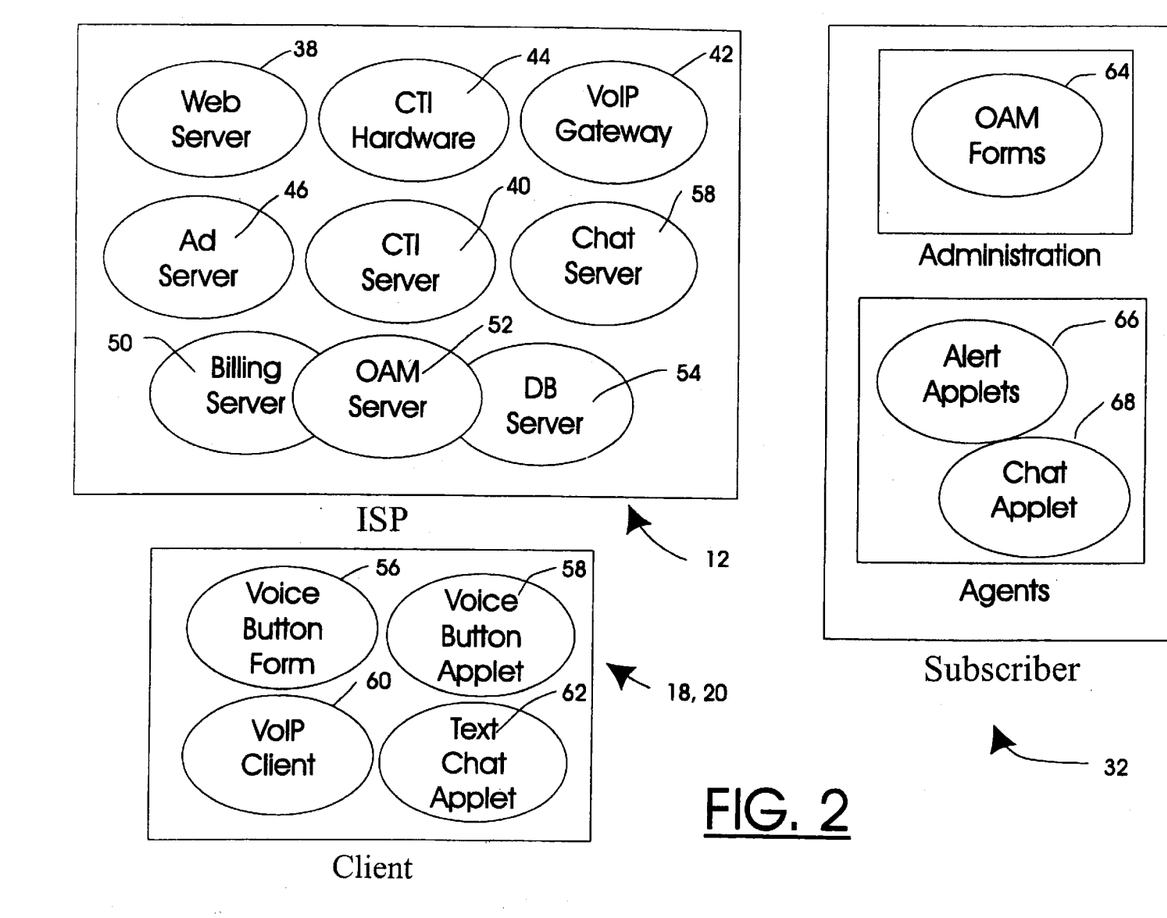
FIG. 2 is a schematic diagram of the software and hardware components required to practise the invention.

FIG. 2 is a block diagram of the hardware and software components required to practise a preferred embodiment of the invention. The components located at the ISP include the web server 38, CTI hardware 44, the VoIP gateway 42 and the CTI server 40. In accordance with a preferred embodiment of the invention, there is also provided an advertisement server 46 for downloading advertisements to voice buttons as will be explained below in more detail. A chat server 48 permits text chats between clients 18, 20 and service subscribers 32 in a manner well known in the art. A Billing server 50 tracks PSTN usage and long distance charges and prepares call detail records for the ISP which uses the call detail records to prepare bills for its service subscribers. An operations, administration and maintenance server 52 (OAM server) permits the ISP and service subscribers to maintain rule bases which control and customize services provided using the apparatus in accordance with the invention, as will also be explained below in more detail. An industry standard database server 54 stores call detail records and OAM records to facilitate maintenance and reporting. Typically, billing server 50, OAM server 52 and DB server 54 are implemented on a single machine although other implementations are possible. Likewise, the CTI hardware 44 and the CTI server 40 are typically integrated into a single machine. The CTI server may also include the chat server 48 which is an "thin server". The Web server 38 will typically also accommodate the advertisement server 46. Likewise, the VoIP gateway 42 may be integrated into the CTI server 40.

The servers 38 and 46–54 have certain functional requirements. In particular, the voice web server 38 requires no special hardware but must support the ability to download JAVA applets to the clients 18, 20 workstations and/or the subscriber workstations 34.

The CTI server 40 must be programmed to handle call setup protocol on receipt of voice communication requests and to pass alerting applets to subscriber agents as will be described below. The CTI server 40 also controls all of the CTI hardware 44 including call setup and tear-down functions. In addition, the CTI server 40 interfaces to the VoIP gateway 42 which may be, for example, a Brooktrout/ANALOGIC® H.323 board commercially available from Brooktrout Technology in Nudham, Mass., U.S.A. It likewise controls all voice connections to the PSTN 14 and controls most of the server logic.

The optional advertisement server 46 is used to feed advertisement script to voice button applets to enhance the visual appeal of the applets and to provide an additional stream of revenue.

The chat server 48 enables text chat sessions between clients 18, 20 and the service subscriber 32. The chat server must be programmed to interact with the CTI server 40 to establish a chat session, supervise chat protocol between the clients 18, 20 and the service subscriber 32 to send chat applets on request. It also handles requests to start text chat sessions and facilitates those sessions between clients 18, 20 and service subscriber 32 workstations. As noted above, the chat server is a thin server and may be integrated with the CTI server 40.

The billing server 50 consolidates Telco billing records with voice connections stations established by the apparatus in accordance with the invention and generates call detail records for the ISPs which are used to generate service bills for the subscribers 32. Suitable billing applications are commercially available and require minimal customization.

The OAM server 52 provides a web interface for ISP and subscriber administration functions. The OAM server provides the tools to create subscribers, subscriber access and to create, store and maintain the rules which customize the functions of the apparatus to serve each particular subscriber's needs. Each time a call is placed, the WEB server 38 retrieves relevant rules from the OAM server 52 to determine how the subscriber leg of the call is to be set up.

The database server 54 ports an industry standard ODBC database for storing, logging and call detail records. The DB server 54 also stores the rule base.

FIG. 2 also shows the software requirements for the client 18, 20 workstations. The voice button used to initiate a voice communication session with the service subscriber 32 may be a voice button form 56 written in CGI scripts that are embedded in the web page code that transmits appropriate call setup messages to the web server 38. It may likewise be a voice button applet 58 written as a JAVA applet that is loaded at the same time as the web page is loaded into the client 18, 20 web browser. The applet transmits the appropriate call setup messages to the web server 38. A voice button hyperlink (not illustrated) may also be used. A hyperlink with the web page that links with appropriate CGI scripts on the web server 38 may be used for this purpose. When accessed, the CGI script on the server transmits the appropriate call setup messages to the web server 38. If voice over IP communications are to occur, the client 18, 20 workstation must include a VoIP client 60 that receives call setup requests from the VoIP gateway 42. If the web server 38 detects that the client 18, 20 does not have a VoIP client 60 resident, the web server 38 could be enabled to request permission to download an appropriate VoIP client 60.

The text chat applet 62 provides a text chat form to enable a text chat session with the service subscriber 32. A text chat applet 62 is only required if a text chat session is requested. It is assumed that in most instances voice communications will be the preferred medium of information exchange.

FIG. 2 also shows the functional requirements required for the service subscriber 32. The service subscriber 32 requires an administrative function to perform the administration and maintenance required for the service. A call handling agent for the service subscriber 32 may also be an administrator. Administration is accomplished by logging onto the OAM server 52 which downloads administration forms (not illustrated) required to create and maintain rules respecting the handling of calls initiated by the CT server 40 under control of the web server 38. As will be explained below, the rules established by administration determine how the service subscriber 32 leg of each voice communication is established. All administration is handled using OAM forms 64.

The service subscriber agents require alert applets 66 and chat applets 68 on their workstations. The alert applets are used to send call alerts to subscriber stations during call setup, as will be explained below with reference to FIG. 5, and optionally to permit a subscriber agent to accept or refuse any call requests. The chat applets 68 are used to permit text chat sessions, as described above.

Figure 3A:
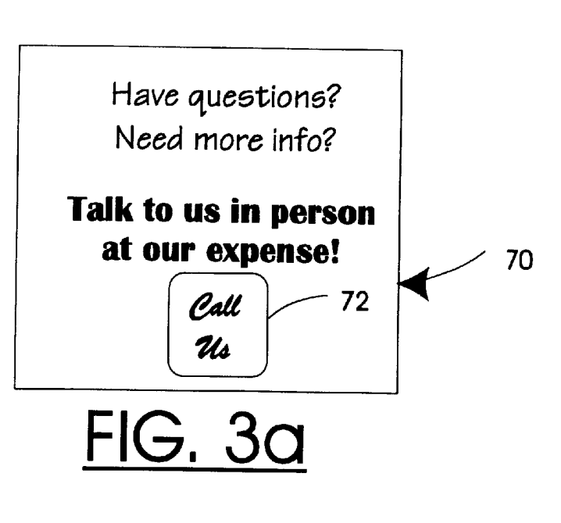
FIGS. 3a and 3b are schematic diagrams representing voice buttons in accordance with a preferred embodiment of the invention.
Figure 3B:
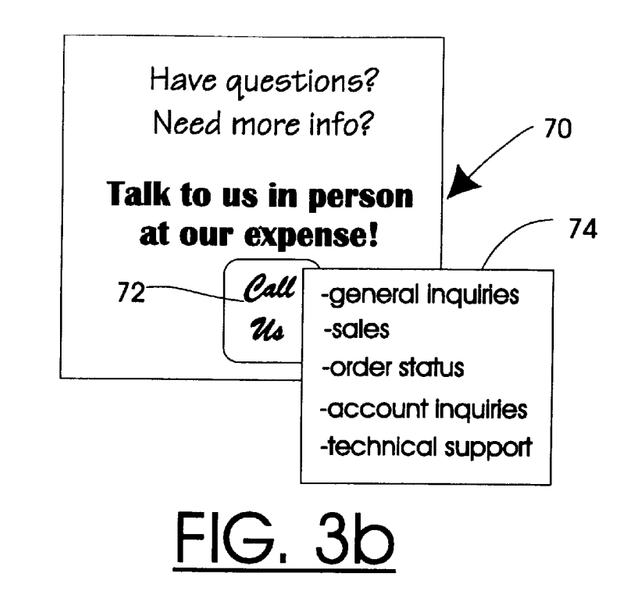
Figure 4:
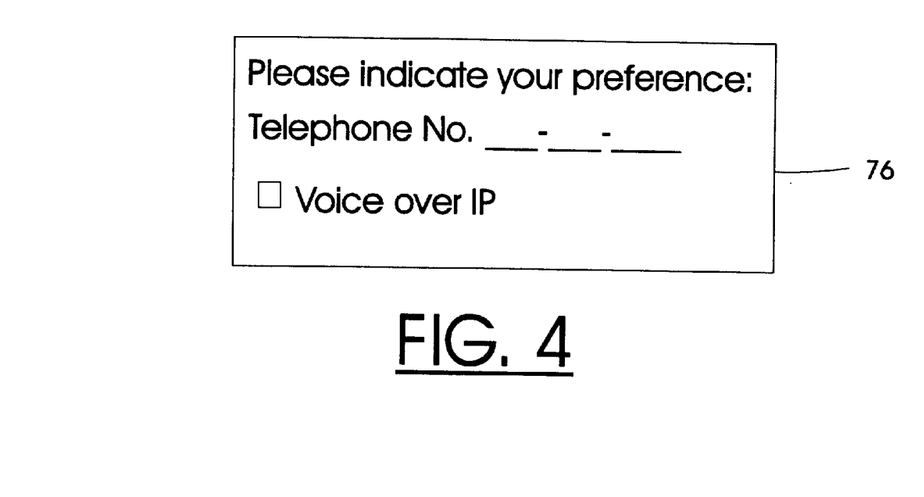
FIG. 4 is a voice request preference form in accordance with a preferred embodiment of the invention.

FIGS. 3a and 3b show an example of a voice button 70. In actual practice, a voice button 70 may have any appearance and the example shown is exemplary only. If a client 18, 20 clicks on the "Call Us" button 72 shown in FIG. 3a, a voice communication request is initiated which prompts a voice communication request form 76 shown in FIG. 4. It will be understood by those skilled in the art that an interactive information page may have two or more voice buttons, each dedicated to the same or different functions. Alternatively, the service subscriber 32 may wish to direct specific inquiries to different agents and/or different locations using one voice button. In that case, clicking on the "Call Us" button 72 may initiate a drop-down menu 74 (see FIG. 3b) which permits the client 18, 20 to direct the voice communication request to a specific topic or category. The rule bases created by the service subscriber 32 will determine where calls for each category are directed. When a specific category is selected, the user is then presented with a form to determine the preferred medium for voice communication or there is a lookup of a pre-stored preference file commonly called a "cookie" on the client hard drive. In the example of client 18 presented above, the client 18 must either select VoIP by clicking the radio button beside that selection, or may specify his telephone number but in that instance he is required to disconnect from his ISP before the telephone call can be received. In the example of client 20, the client may indicate his telephone number and is permitted to remain connected to his ISP during the telephone conversation with the service subscriber 32.

Figure 5:
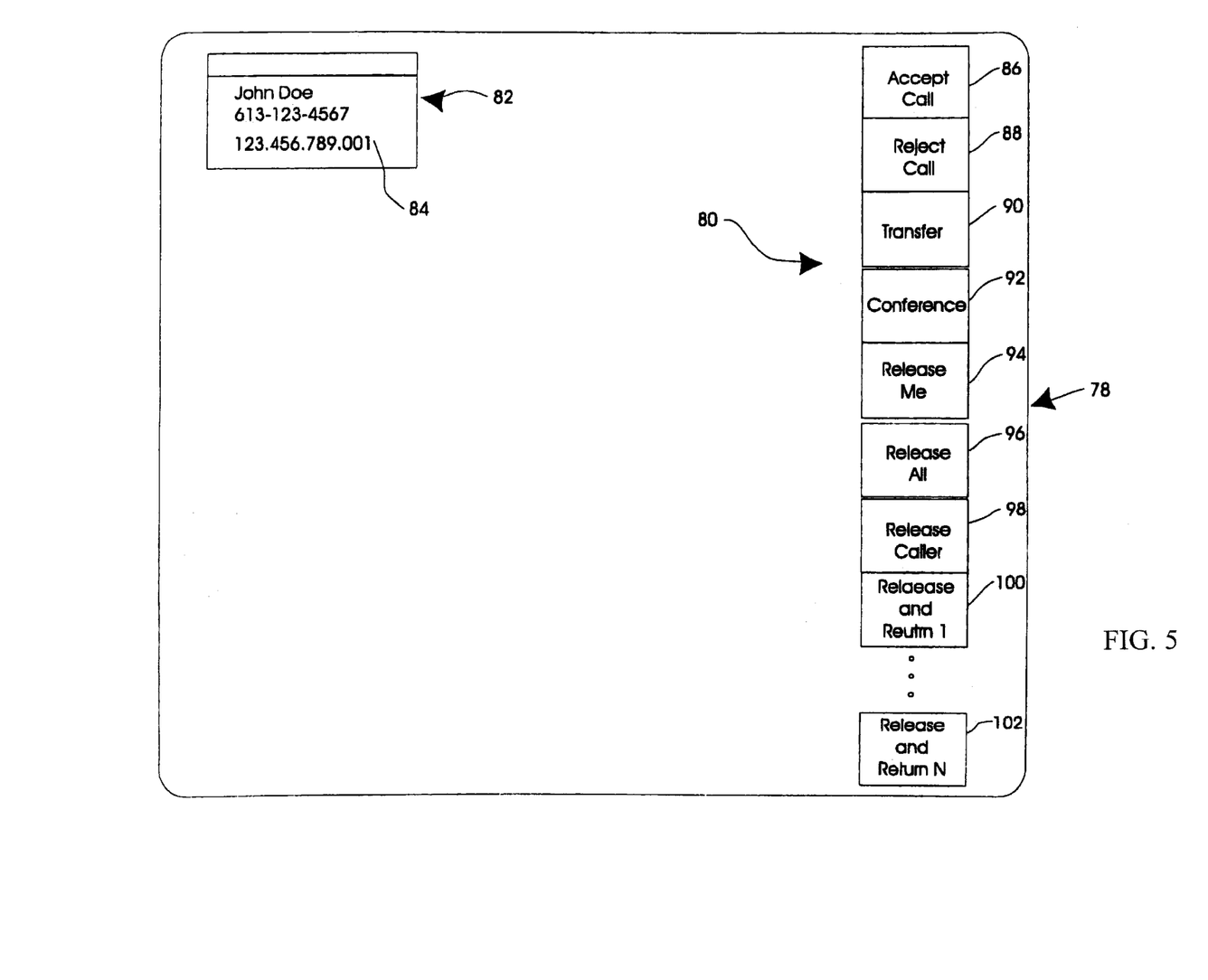
FIG. 5 is a schematic diagram representing a business agent screen display in accordance with a preferred embodiment of the invention.

FIG. 5 is a schematic representation of one potential implementation of a screen display 78 for the workstation 36 of a call handling agent for the service subscriber 32. In this example, a plurality of buttons are available on a call agent toolbar 80 to permit the call agent to rapidly handle and manipulate calls from users browsing the WWW. It should be understood that the functions described below are exemplary only. Other functions may be created and not all functions described need be implemented in order to practise the methods with the apparatus in accordance with the invention. When a user such as client 18, 20 initiates a call request, the web server 38 preferably sends an alert applet 66 (see FIG. 2) to the agent screen display 78. The alert applet 66 preferably opens an alert window 82 on the screen display 78. The contents of the alert window 82 will depend on the type of connection established with the user and the information available from the connection, as well as implementation preferences. In the example illustrated, a user John Doe has requested a voice connection over a telephone line using telephone number 613-123-4567. The user name is identified from the telephone number and displayed to the call handling agent. Also provided is the URL 84 of the page which the user John Doe was viewing at the time he placed the call request. The URL 84 is a hyperlink. If the call agent wishes to view the same page that John Doe is viewing, he may click on the URL which will display that page on his workstation.

As explained above, the toolbar 80 includes a plurality of buttons which enable various call handling functions. For example, the toolbar 80 may include buttons which permit the call handling agent to accept the call displayed in the alert window 82 using an accept call button 86. The call handling agent may also reject the call by using reject call button 88. If the call is accepted or rejected, it is handled by the web server 38 in accordance with service subscriber 32 rules as will be explained below in more detail.

If a call is in progress, the call handling agent may transfer the call using a transfer call button 90 to hand the call off to any other appropriate person as will also be described below in more detail. While a call is in progress, the call handling agent may conference others into the conversation using the conference button 92. After a conference is accomplished, the call agent may release himself from the call using the "Release Me" button 94. The call handling agent may also release all parties from the call, including the calling party, using a "Release All" button normally used when a call is completed in order to rapidly free all resources. An option may also exist to release the caller using a "Release Caller" button 98 in an instance where, for example, the caller has raised a question which requires that the call handling agent contact another for advice, in which case the agent may release the caller until he has obtained information appropriate to answer the question and return the call after the information is at hand. "Release and Return" buttons such as 101 and 102 may also be implemented. These buttons may be enabled to release the call handling agent for a period of time while, for example, a caller listens to or views prerecorded audio or multi-media information. During the audio or multi-media broadcast, the call handling agent is released to perform other functions. After the broadcast is completed, the call is automatically returned to the call handling agent to answer any further questions the caller may have. This function permits a business to prerecord answers to, for example, most frequently-asked questions or most frequently-sought information. When convenient and appropriate, the call handling agent may quickly enable a broadcast by using the release and return buttons 100, 102 on the screen display 78.

Figure 6:
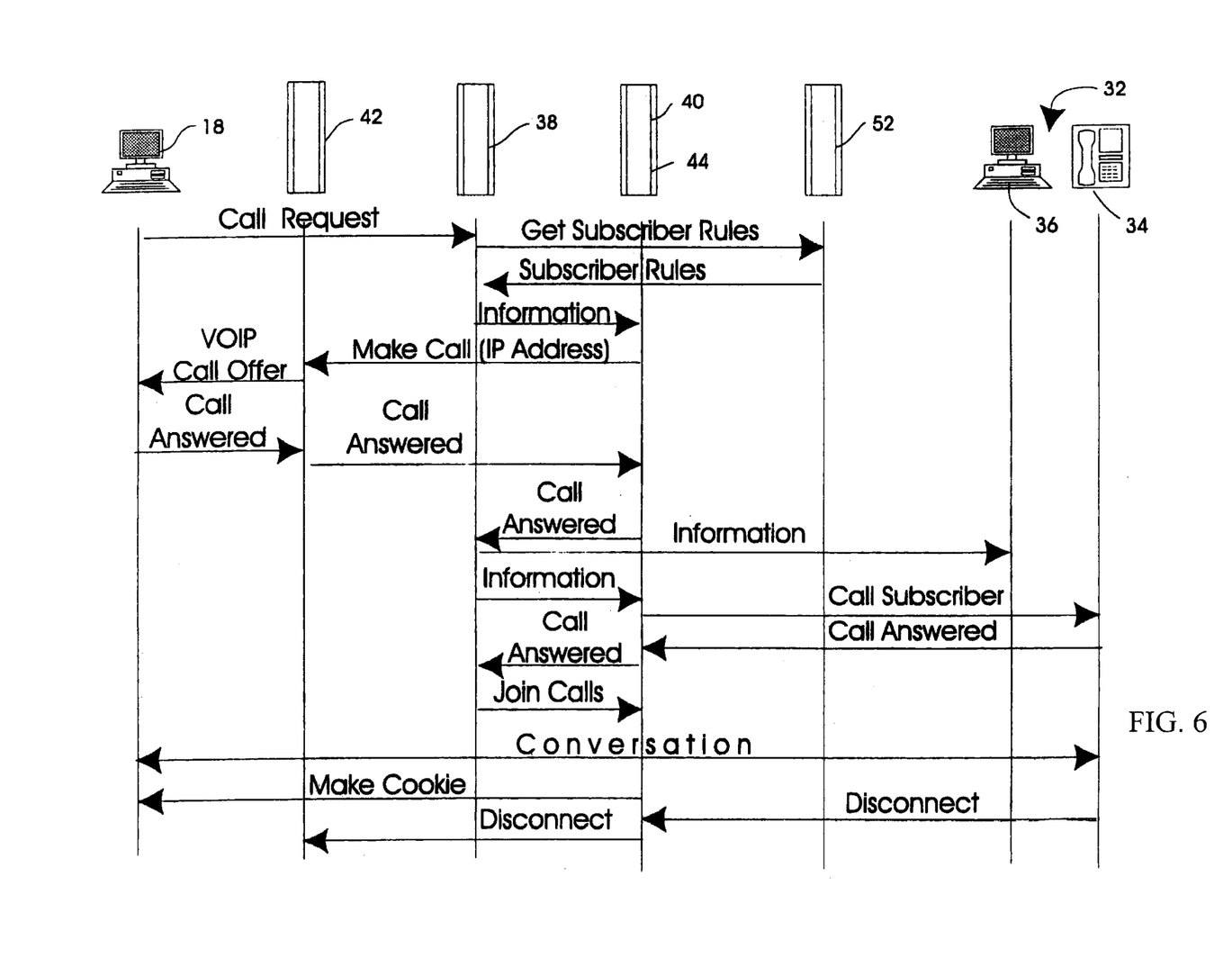
FIG. 6 is a schematic diagram of a typical basic call flow of a call process in accordance with the invention.

FIG. 6 is a schematic diagram showing a simple call sequence in accordance with the invention. For simplicity of illustration, the user is browsing the WWW using client station 18 and the service subscriber 32 has only one workstation 36 and one business phone 34. The user initiates a call request from an interactive information page maintained for the service subscriber 32. The call request is forwarded over the Internet to the web server 38. The call request may include the preferred call completion medium for the client 18 which is automatically attached to the request by the user's web browser if a preference "cookie" is available on a hard drive of the client 18. If the request does not include the preferred call completion medium for the client 18, the web server 38 sends a preference form (see FIG. 4) to the client 18 requesting the information. On receipt of the call request or the preference form, the web server 38 queries the OAM server 52 to obtain subscriber rules to determine how the call request is to be completed to the subscriber 32. The web server 38 then passes information to the CTI server 40 which operates the CTI hardware 44 to place a first call to the user client 18. In this example, the user client 18 has requested a VoIP call connection. The CTI server therefore sends a request to the VoIP gateway 42 to make a VoIP call offer to the user client 18. The call offer is accepted by the user client 18 and the call is answered. The VoIP gateway 42 informs the CTI server 40 that the call has been answered and the CTI server 40 informs the web server 38 that the call connection is complete. The web server 38 forwards call alert information to the workstation 36 of service subscriber 32. The call alert information "pops" open a call alert window 82 (see FIG. 5) on the workstation 36. Web server 38 then passes information to the CTI server 40 to enable a call to the service subscriber 32. In this example, the service subscriber has specified that calls be completed over the PSTN to the business telephone 34. The CTI server 40 therefore initiates a PSTN call. The PSTN call is initiated using, for example, a trunk link to the PSTN having a PRI interface, well known in the art. A PRI packet is therefore sent over the trunk to the PSTN which completes the call in a manner well known in the art. When the service subscriber 32 answers the call on business phone 34, the CTI server 40 informs the web server 38 that the call is answered. The web server 38 then instructs the CTI server 40 to join the calls and conversation between the user client 18 and the service subscriber 32 ensues. In this instance, the first leg of the call is a VoIP call and the second leg of the call is a PSTN voice connection. If this is a first-time user of the service by the user client 18, the CTI server may be programmed to make a preference file cookie which it sends to the user client 18. If the cookie is accepted, the cookie is stored on a hard drive of the user client 18 where it may be used to in future determine the voice connection medium preference and other variables related to a connection with the user client 18. After conversation between the user and the service subscriber is complete, the service subscriber 34 will typically disconnect which causes disconnection of the user 18. The disconnect is effected by the CTI server 40 which requests the VoIP gateway 42 to disconnect the VoIP session.

Figure 7:
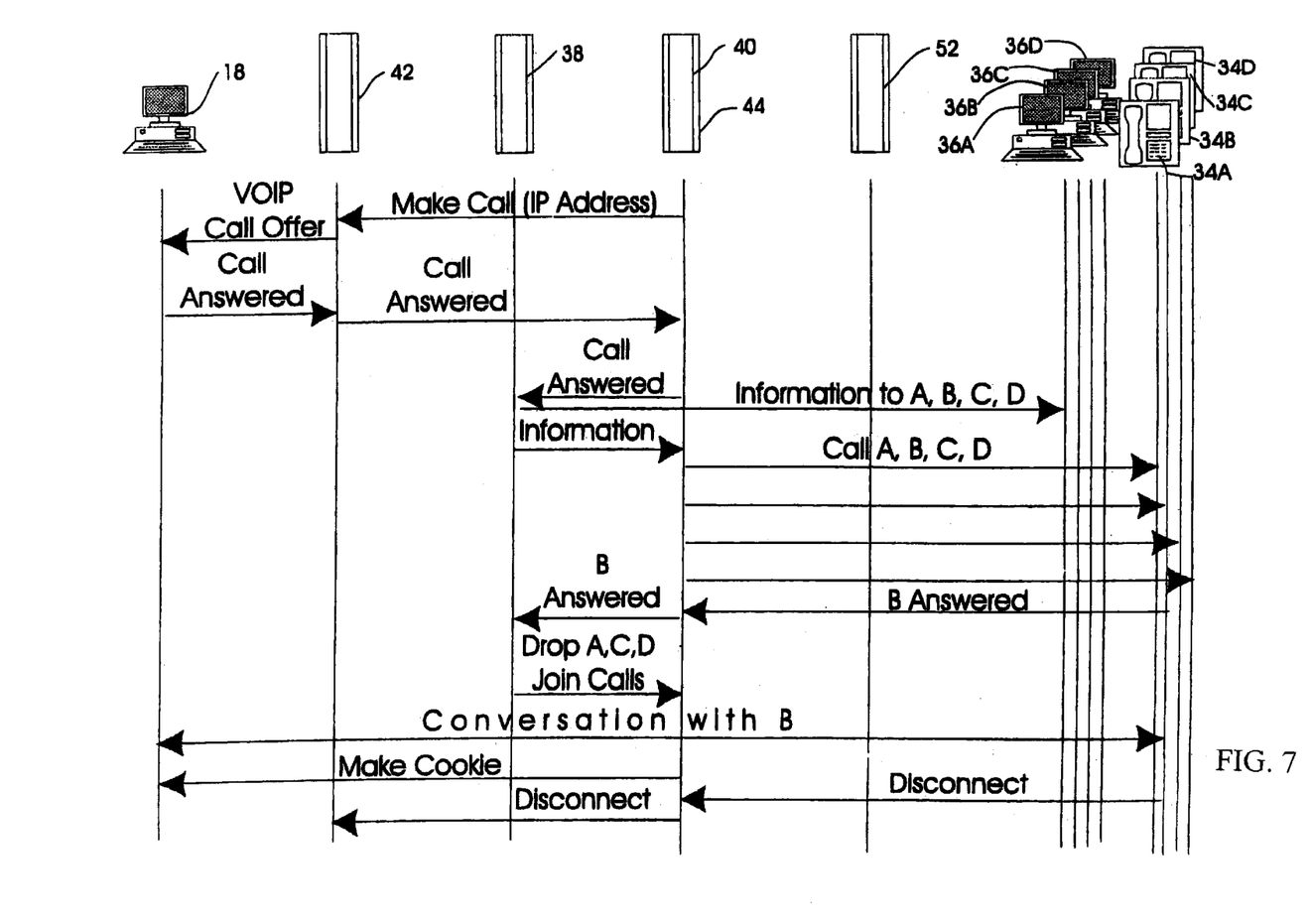
FIG. 7 is a schematic diagram illustrating one optional call process using apparatus and methods in accordance with the invention.

FIG. 7 illustrates a more complicated call distribution option enabled by the methods and apparatus in accordance with the invention. This option is referred to as the use of "simultaneous notification groups" (SNGs). In this example, service subscriber 32 has four call handling agents which use business phones 34A–34D and workstations 36A–36D. The call handling agents may be located in the same premises or may be located anywhere that is convenient so long as appropriate facilities are available. For the sake of clarity, the initial call request is not shown in FIG. 7. A described above, user client 18 initiates a VoIP call request and the web server 38 in cooperation with the CTI server 40 and the VoIP server 42 set up a VoIP call to the user client 18. The subscriber rules retrieved by the web server 38 (see FIG. 6) indicate that call attempts are to be made simultaneously to four service subscriber agents defined in an SNG. As described above, a call alert is sent to each of workstations 36A–36D and PRI packets are sent over the PSTN trunk connection to substantially simultaneously initiate calls to call handling agents A, B, C and D in the SNG. SNGs are particularly useful if it is unpredictable as to which of several agents may be available to take a call, but a rapid response to user calls is desired. In this example, B answers the call first, which is sensed by the CTI server 40. CTI server 40 informs web server 38 that B has answered the call. Web server 38 instructs the CTI server 40 to drop calls to A, C and D and to join the VoIP call to user client 18 with the PSTN call to call handling agent B of service subscriber 32. Conversation between user client 18 and call agent B then ensues. If appropriate, a cookie is made and sent from the CTI server 40 to the user client 18. After the call is completed, call handling agent B disconnects which causes the CTI server 40 to disconnect the VoIP call to user client 18.

In addition to the SNGs described above, the invention may be used to implement a feature called "agent locator" in which the calls to A, B, C and D are, for example, separate numbers for the same individual. This permits a call handling agent which circulates between premises or the like to be reached regardless of his location. This feature may be further enhanced if a party who answers the call is prompted to accept the call request by dialing a given sequence. For example, "This call is for John Smith, please accept by pressing 1 now.". This minimizes the probability that a call will be accepted by the wrong call handling agent and greatly enhances the flexibility of the service agent locator feature. If the agent locator feature is used, it may be desirable to structure the rule base so that only certain numbers are dialed in a first connection attempt. For example, it may be desirable to dial simultaneously a first and second work number, a home number and a cellular phone number. A pager number is not dialed, however, because it is programmed to answer calls on a first ring and the agent would receive a page even though he is available at one of the other numbers to take the call. The proper structuring of rule bases to properly handle call features will be apparent to those skilled in the art.

Figure 8:
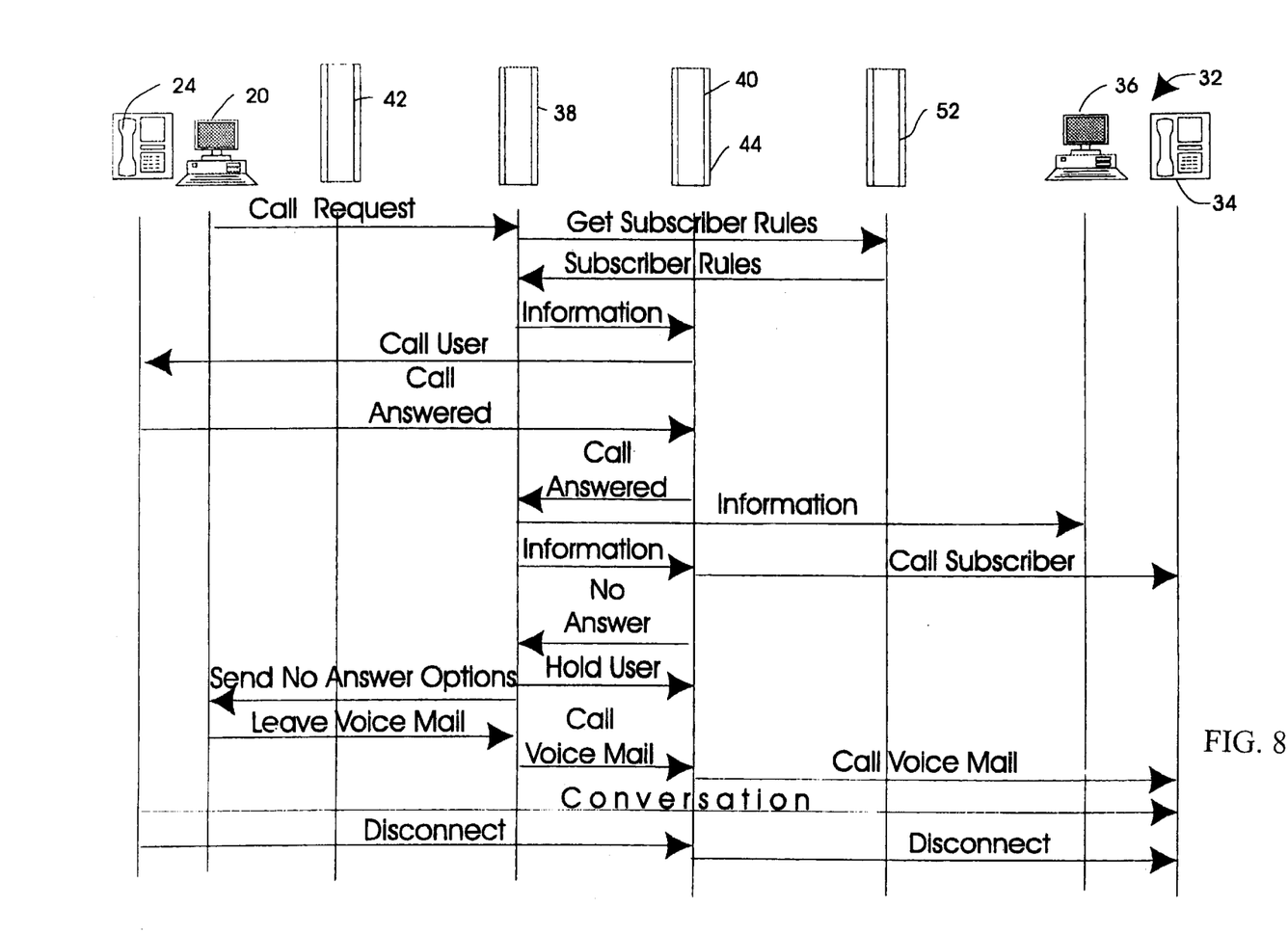
FIG. 8 is a schematic diagram illustrating the call flow of another optional call process using the methods and apparatus in accordance with the invention.

FIG. 8 shows another call sequence enabled by the method and apparatus in accordance with the invention. In this example, user client 20 initiates a call request to his telephone 24. On receipt of the request, the web server 38 requests subscriber rules from OAM server 52. After the rules are obtained, the web server 38 sends information to CTI server 40 instructing the CTI server 40 to call user client 20 by placing a PSTN call to the telephone 24. The CTI server 40 informs the web server 38 that the call is answered when the user client 20 answers the telephone 24. Call alert information is then sent by the web server 38 to the subscriber workstation 36 as described above and information obtained from the subscriber rules is sent to the CTI server 40 to instruct the CTI server 40 to call the subscriber 32 unless the call alert is rejected at the subscriber workstation 36. In this example, the subscriber is unavailable and the subscriber call is not answered. After a predetermined time period, the CTI server 40 informs the web server 38 that no answer has been received from the subscriber call. The web server 38 again consults the subscriber rules and instructs the CTI server to hold the user while no answer options are sent to the user client 20. While the user is on hold, the CTI server 40 may be enabled to broadcast music or information to the subscriber telephone 24 in a manner well known in the art. The "no answer" options downloaded to the user client 20 may, for example, include:

1) Leave a text message;
2) Leave a voice mail message;
3) Call me back at a specified time.

In this example, the user client 20 elects to leave a voice mail message and selects option 2 . The option is sent to the web server 38 which instructs the CTI server 40 to connect the user to the voice mail system of the service subscriber 32. The CTI server 40 places a call to the voice mail system of the service subscriber 32 and the user leaves the voice mail message in a manner that is well understood. When the message is completed, the user hangs up which sends a disconnect signal to the CTI server 40 causing the CTI server 40 to disconnect from the service subscriber's voice mail.

Figure 9A:
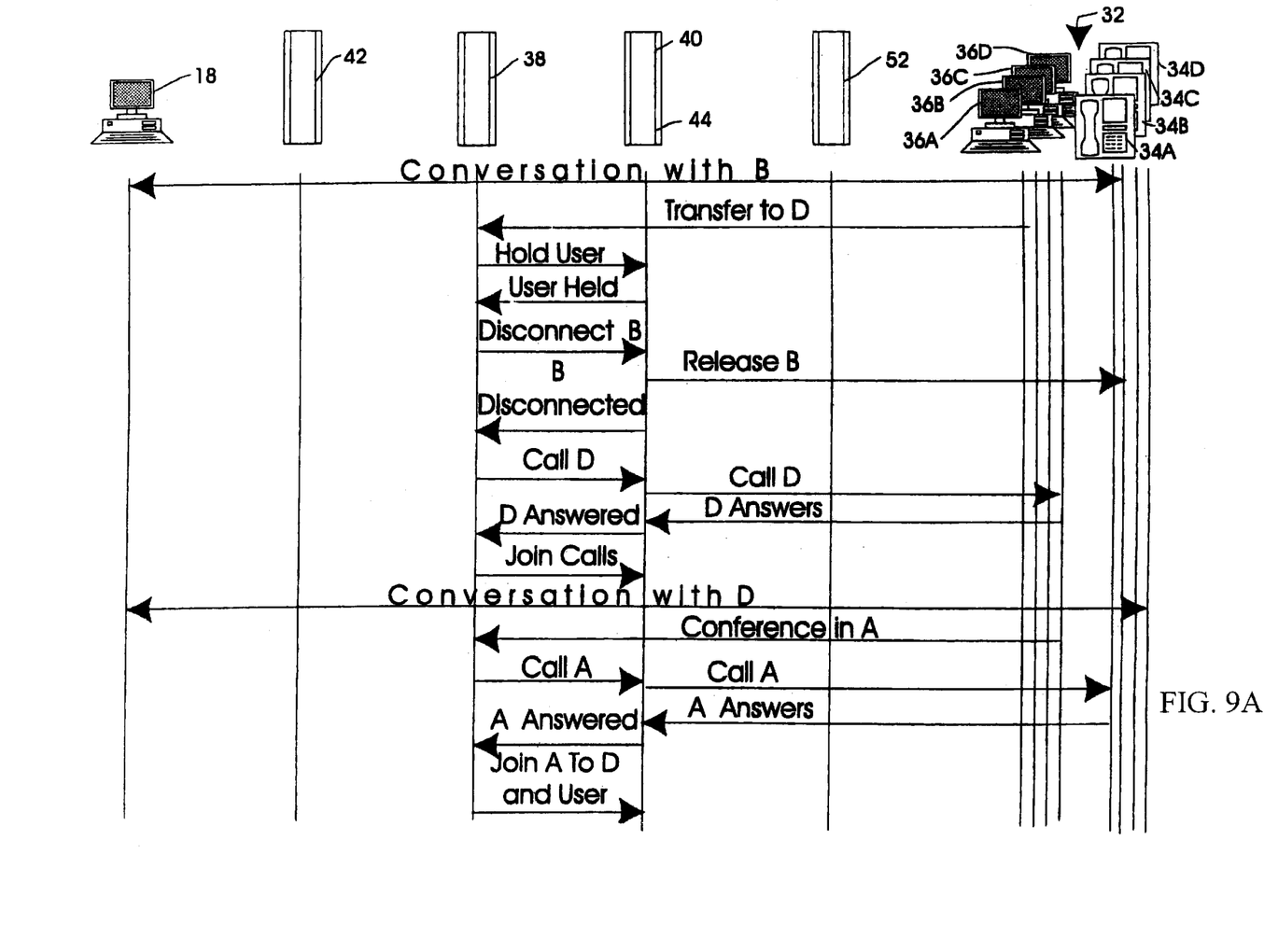
FIGS. 9a and 9b are schematic diagrams of portions of call flows showing the flexibility of call handling using the methods and apparatus in accordance with the invention.
Figure 9B:
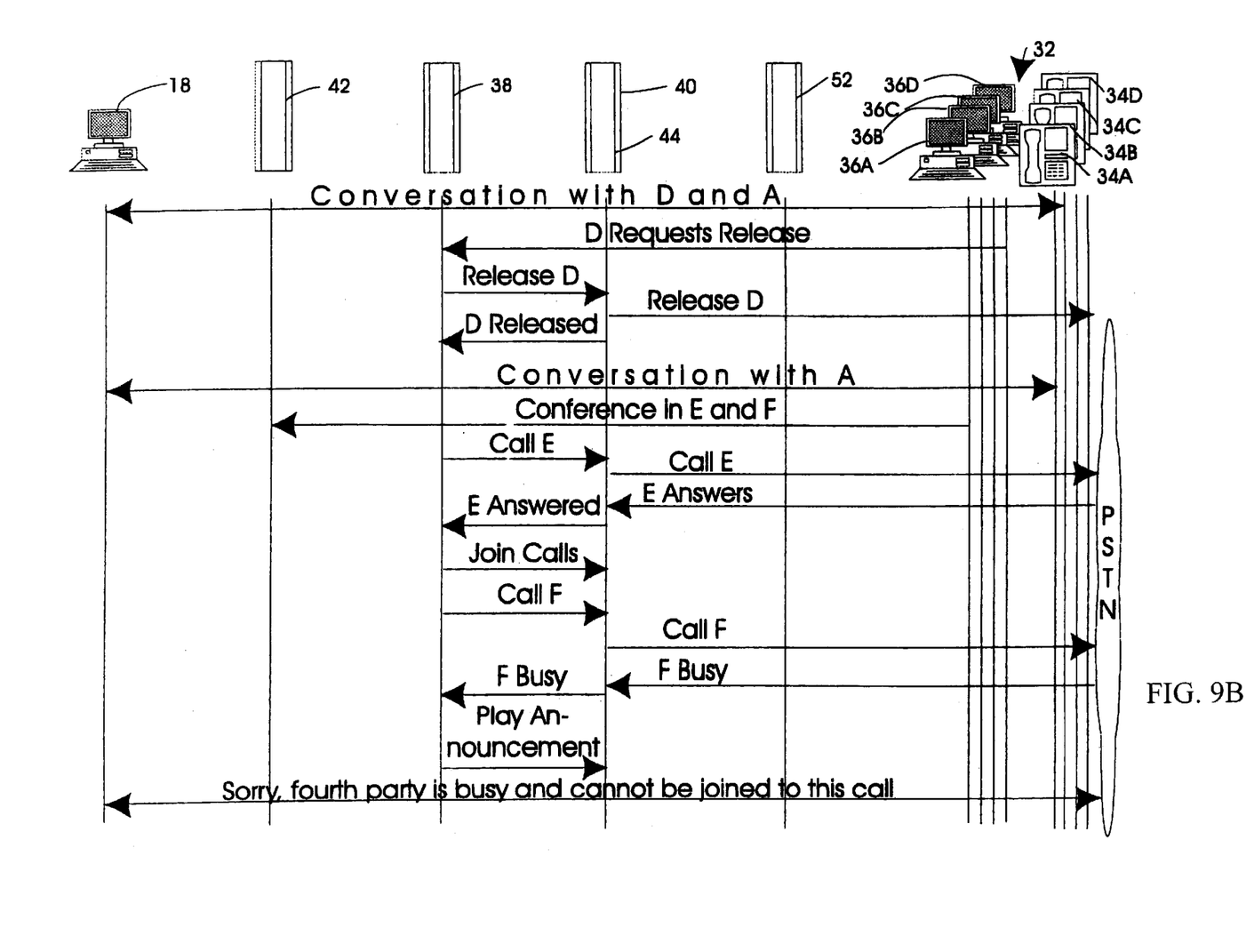

FIGS. 9a and 9b show partial call sequences which further illustrate the flexibility and utility of the methods and apparatus in accordance with the invention. In this example, a VoIP call is established with user client 18 and a PSTN call is established with call handling agent B of service subscriber 32. During the conversation, the user asks questions which B determines are better answered by call handling agent D. The call handling agent B therefore selects the transfer call button 90 (see FIG. 5) on his screen display 78 which initiates a transfer function form (not illustrated) to enable the call to be transferred. The user B completes the form which is automatically sent to the web server 38. On receipt of the form, the web server 38 instructs the CTI server 40 to hold the call to user client 18. The CTI server 40 responds that the user client 18 is on hold. The web server 38 then instructs the CTI server 40 to disconnect B. The CTI server 40 disconnects B and confirms the disconnection to the web server 38. Web server 38 then instructs the CTI server 40 to call agent D. The CTI server 40 calls agent D. When call handling agent D answers, the CTI server 40 informs the web server 38 that the call has been answered and the web server 38 instructs the CTI server 40 to join the calls. Conversation between the user and call handling agent D then ensues. Call handling agent D subsequently, for example, learns that information is requested which is best supplied by call handling agent A. D therefore sends a request to the web server 38 using the conference call button 92 (see FIG. 5) to conference in A. On receipt of the conference call request form (not illustrated) the web server 38 instructs the CTI server 40 to call A. When A answers, the CTI server 40 confirms to the web server 38 that A has answered and the web server 38 responds by instructing the CTI server 40 to join A to D and the user client 18. A three-way conversation between the user client 18 and call agents D and A ensues. D thereafter determines that he has no further contribution to make to the conversation so using the Release Me call button 94 on his agent screen display 78 (see FIG. 5) he sends a release request to the web server 38 which instructs the CTI server 40 to release D. CTI server 34 releases caller D and confirms the release to the web server 38. Thereafter conversation with A ensues. During that conversation, A determines that information from E and F are required to supply all the requests of user client 18. E and F are, for example, experts available at a related company. Call handling agent A therefore uses his conference call button 92 to send a conference request for callers E and F. On receipt of the request, the web server 38 instructs the CTI server 40 to call E. The CTI server 40 places a PSTN call to E and E answers the call. The CTI server 40 informs the web server 38 that the call has been answered and the web server 38 instructs the CTI server 40 to join E to the conversation between the user and call handling agent A. The web server 38 then instructs the CTI server 40 to call F. It will be understood by those skilled in the art that E and F could have been called simultaneously as well. In this example, the CTI server 40 calls F but determines that F's phone is busy. The CTI server 40 informs the web server 38 that F is busy and the web server 38 instructs the CTI server 40 to play an announcement to the user, call agent D and E. The CTI server 40 then uses a prerecorded message or a voice synthesizer to announce that the fourth party is busy and cannot be joined to the call. Call disconnection proceeds as described above. This sequence is illustrative only of the flexibility in call handling enabled by the apparatus and methods in accordance with the invention.

Figure 10:
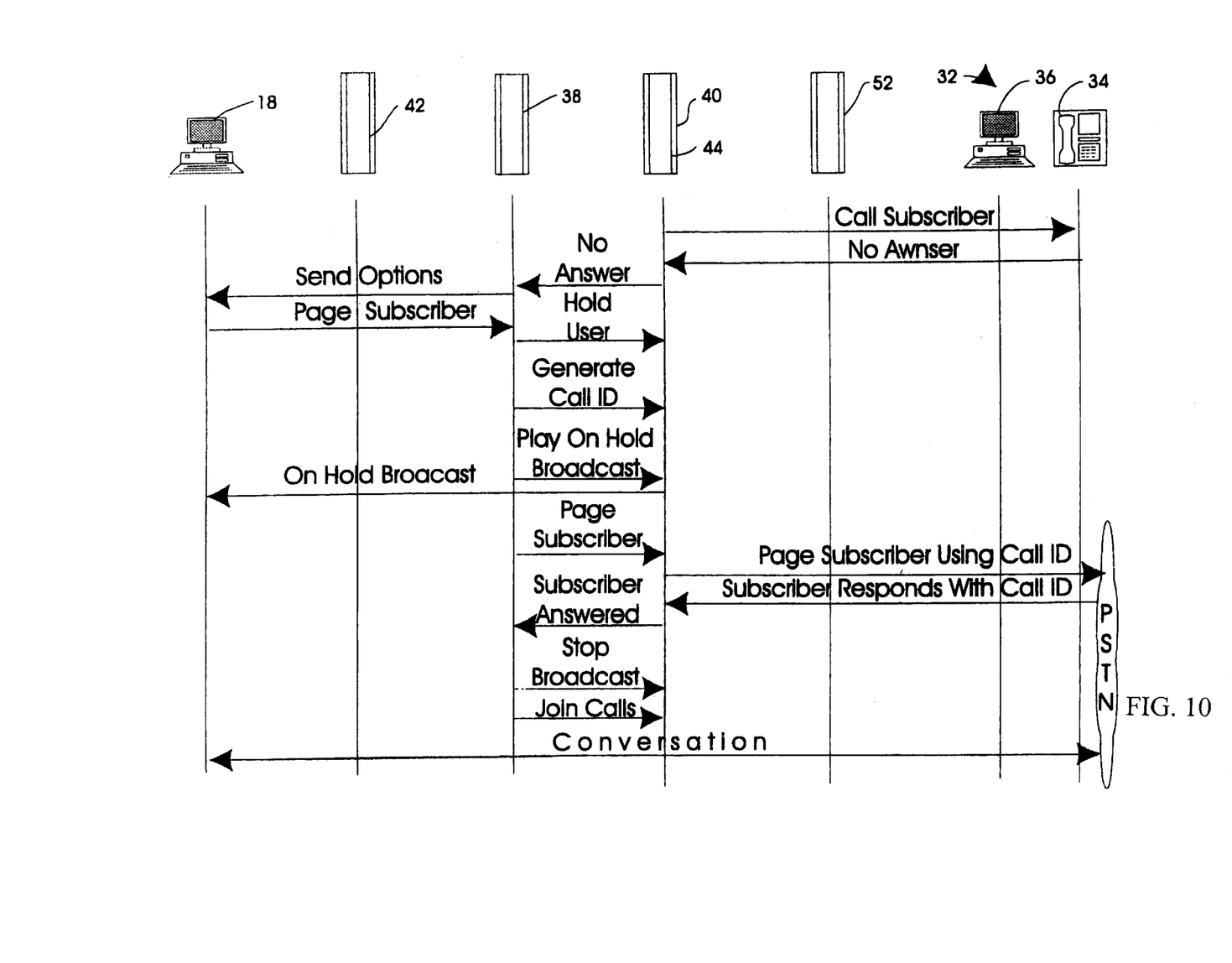
FIG. 10 is a schematic diagram showing a portion of a call flow for a further call feature enabled by the methods and apparatus of the invention.

FIG. 10 illustrates yet another feature enabled by the methods and apparatus in accordance with the invention called "automated page return". Only a portion of the call sequence is illustrated in FIG. 10. The call sequence begins after the web server 38 has instructed the CTI server 40 to call the subscriber 32. In this example, subscriber 32 is not available and does not answer the telephone 34. After a predetermined time, the CTI server 40 informs web server 38 that the subscriber has not answered. In response, the web server 38 instructs the CTI server 40 to hold the user (not illustrated) and sends an options list to the user client 18. Among the options is an option to page the subscriber. The user client 18 selects the page subscriber option and returns the option request to the web server 38. On receipt of the option request, the web server 38 again instructs the CTI server 40 to hold the user and to generate a call identification number which will be used to identify the call connection to the user client 18. The identification number is recorded in a table together with a port number, for example, to identify the call connection in a manner well known in the art. The web server 38 then instructs the CTI server 40 to play an on-hold broadcast to the user client 18. The on-hold broadcast may be recorded music, audio advertising, or multimedia information or advertising, for example. The CTI server 40 begins the broadcast over the user call connection. The web server 38 then supplies a pager number from the rule base and instructs the CTI server to page the subscriber. The CTI server 40 dials the pager number using the PSTN and when the paging service answers the CTI server 40 sends the call identification number, which is displayed on the subscriber's pager. The subscriber responds by calling a predetermined number that connects the subscriber to a port of the CTI hardware 44. On connection, the subscriber enters the call ID, for instance the number "1". On receipt of the call ID, the CTI server 40 informs the web server 38 that the subscriber has answered. The web server 38 instructs the CTI server 40 to stop the broadcast to the user client 18 and to join the calls using the call ID to locate the user client 18. The CTI server 40 joins the paged subscriber with the user client 18 enabling conversation to ensue. Call disconnect sequences are as described above. The automated page return feature enables a paged subscriber to be connected directly to a caller using a simple call identification number rather than dialing the user directly as is normal for other paging services. This permits the service subscriber 32 to take advantage of discount call rates available through the service provider. It also enables the return of paged calls to a VoIP connection which is otherwise impossible using prior art methods.

Many other features and functions are also enabled by this invention. For example, a business may wish to be able to distinguish calls from established clients from those of potential clients. This may be accomplished in several ways. For example, two voice buttons may be used. One of the voice buttons may require an access code such as a password, or may be placed on a subordinate web page that requires a password. Calls from each voice button may be directed to a different termination, or they may be directed to different numbers which terminate at the same address but cause different ringing patterns to permit call agents to determine the origin of the call.

The various call features and sequences described above are intended to be exemplary only. It is substantially impossible to provide a comprehensive description of the features enabled by the method and apparatus in accordance with the invention. The explicit examples described are therefore exemplary only and are not to be taken as limiting the scope of this invention.

We claim:

1. A method of providing voice communications between two parties using computer controlled telephony hardware which is outside the Public Switched Telephone Network (PSTN), one of the parties having access to a data network, comprising:

accepting a voice communication request initiated by the party having selected a voice button to initiate the voice communication request;

originating a first voice connection from the computer controlled telephony hardware outside the PSTN under control of a computer telephony server in response to the voice communication request made by the party having access to the data network, the voice communication request received from the data network including information to permit first and second voice connections to be established;

originating a second voice connection from the computer controlled telephony hardware outside the PSTN under the control of the computer telephony server in response to the voice communication request received from the data network using the information respecting the second voice connection; and bridging together the first and second voice connections using the computer controlled telephony hardware outside the PSTN under the control of the computer telephony server to permit voice communications between the two parties.

2. A method as claimed in claim 1 wherein the first voice connection is a voice over Internet protocol connection and the second voice connection is a voice call placed through the PSTN.

3. A method as claimed in claim 1 wherein each of the first and second voice connections are voice calls placed through the PSTN.

4. A method as claimed in claim 1 wherein each of the first an second voice connections are voice over Internet protocol connections.

5. A method as claimed in claim 1 wherein a plurality of second voice connections are attempted after the first voice connection is established, and each of the plurality of voice connection attempts are cancelled except a first of the second voice connection attempts to be answered.

6. A method as claimed in claim 1 wherein if the first voice connection is originated but the second voice connection cannot be originated, the first voice connection is held while alternate communications options are downloaded over the data network to the called party of the first voice connection.

7. A method as claimed in claim 6 wherein the communications options may include at least one of an option to leave a voice mail message, an option to leave a text message, and option to request a call back at a later time and an option to page the service subscriber.

8. A method as claimed in claim 7 wherein if the called party of the first voice connection selects the option of leaving a voice mail message, the computer controlled telephony hardware outside the PSTN is operated to establish a second voice connection to a voice mail system and the first and second voice connections are bridged together at the computer controlled telephony hardware.

9. A method of providing voice communication between a service subscriber and a user of a data network accessing an interactive information page available on the network using a data terminal, comprising the steps of:
   a) accepting at a voice button server a voice communication request initiated by the user using a voice communication request button associated with the service subscriber and available on the interactive information page;
   b) analyzing at the voice button server the voice communication request, or a preference file sent from the user's data terminal, to determine a voice connection medium preferred by the user;
   c) consulting a rule base using a code that identifies the subscriber to locate at least one rule that determines how a voice connection is to be established with the subscriber;
   d) operating a computer telephony server to control computer telephony hardware outside the PSTN to place a first call to the user by the preferred voice connection medium;
   e) operating the computer telephony server to control the computer telephony hardware outside the PSTN to place a second call to the subscriber in accordance with the at least one rule located in the rule base;
   f) operating the computer telephony server to control the computer telephony hardware outside the PSTN to bridge the first and second calls;
   g) monitoring the data network for an indication that a modification of a configuration of the voice communication is desired by either the user or the subscriber and changing the configuration of the voice communication if an indication for change is received; and
   h) monitoring the first and second voice calls and disconnecting the other of the first and second calls when either of the first or second calls is disconnected.

10. A method as claimed in claim 9 wherein the data terminal is a multimedia computer, the voice connection medium preferred by the user is voice over the data network and the first call is a voice over the data network connection to the data terminal.

11. A method as claimed in claim 9 wherein the voice connection medium preferred by the user is a telephone call through the switched telephone network and the first call is routed by the computer telephony hardware outside the PSTN to the switched telephone network.

12. A method as claimed in claim 9 wherein the rule b indicates that the call is to be connected to any one of a plurality of subscriber terminations and a plurality of second call attempts are initiated to the plurality of subscriber terminations, the first call being bridged to a first subscriber termination to answer one of the second call attempts, the remainder of the second call attempts being cancelled by the computer telephony hardware outside the PSTN when the first of the second calls is answered.

13. A method as claimed in claim 12 wherein the plurality of subscriber terminations are telephone numbers or IP addresses for different agents designated t accept the call.

14. A method as claimed in claim 12 wherein each of the subscriber terminations are different telephone numbers or IP addresses for the same agent designated to accept the call.

15. A method as claimed in claim 14 wherein a person answering a call to any of the subscriber terminations is prompted to enter a code to accept the call.

16. A method as claimed in claim 14 wherein the different telephone numbers comprise a work number, a home number, a cellular number, and a pager number; and the different IP addresses are for a work terminal and a home terminal.

17. A method as claimed in claim 16 wherein the at least one rule dictates that the pager number is to be dialed only if the work number, the home number and the cellular number fail to answer after a predefined number of rings.

18. A method as claimed in claim 9 wherein the voice communication request button includes a menu of voice communication request targets and the rule base selects one or more voice connections for the second call based on the voice communication request target selected by the user.

19. A method as claimed in claim 9 wherein the information page or a subordinate page associated with the information page includes a second voice communication request button that may only be accessed or operated by users in possession of a predefined access code.

20. A method as claimed in claim 19 wherein the rule base is structured to treat calls which originate from the second voice communication request button differently from those that originate from the first voice communication request button.

21. A method as claimed in claim 20 wherein the second calls for call requests that originate from the first voice communication request button are directed to a different termination than the second calls that originate from the second call request button.

22. A method as claimed in claim 20 wherein second calls for call requests that originate from both the first and second voice communication request buttons are routed to the switched telephone network and terminate at the same address on the switched telephone network, but different numbers are used for each of the first and second voice communication request buttons and the switched telephone network is configured to apply a different ringing signal on the subscriber line for each number for the termination, the different ringing signal alerting the subscriber as to which voice communication request voice button was selected.

23. A method as claimed in claim 9 wherein if the second call is not answered after a predefined number of rings, the user is presented with a menu of selections to enable alternate means for communication.

24. A method as claimed in claim 23 wherein the menu includes selections for creating a voice message sending a typed message or entering a request for a call back at a designated time.

25. A method as claimed in claim 24 wherein if the user requests the voice message option, the user is automatically connected to the subscriber's voice mailbox by initiating a second call to the subscriber's voice mailbox and bridging the second call to the first call.

26. A method as claimed in claim 22 wherein the menu includes a selection for paging the service subscriber.

27. A method as claimed in claim 26 wherein when a request for paging the service subscriber is received, the voice connection of the user is held while a call to the service subscriber's paging service is made and a call identification number is sent to the paged subscriber.

28. A method as claimed in claim 27 wherein the call identification number is used to connect the service subscriber to the user when the paged service subscriber calls the computer telephony hardware and enters the call identification number.

29. A system for providing voice communication between a service subscriber and a user of a data network accessing an interactive information page available on the network using a data terminal, comprising in combination:

at least one computing machine programmed with the functionality of:
  a) a voice button server for accepting voice communication requests either directly or indirectly form a user accessing an interactive information page on a data network and selecting a voice request button;
  b) an operations, management and maintenance server to permit the establishment and maintenance of rule bases for governing how the voice communication requests are completed to the service subscriber; and
  c) a computer telephony server for controlling computer telephony hardware outside the PSTN;

a voice over data network gateway for converting voice data packets to voice telephony format; and computer telephony hardware outside the PSTN which may be controlled by the computer telephony server to initiate voice connections on a switched telephone network or a voice gateway to a data network, to bridge calls and to respond to a set of predefined voice connection control commands that may originate from either the service subscriber or the user.

30. A system as claimed in claim 29 wherein the computer telephony hardware outside the PSTN comprises a controller and a switch fabric.

* * * * *